Feb. 10, 1953 J. P. WOODS 2,627,930
APPARATUS FOR UNDERWATER SEISMIC OPERATIONS
Filed July 9, 1948 6 Sheets-Sheet 1

ATTEST

INVENTOR.
John P. Woods
BY
Attorney

Feb. 10, 1953  J. P. WOODS  2,627,930
APPARATUS FOR UNDERWATER SEISMIC OPERATIONS
Filed July 9, 1948  6 Sheets-Sheet 2

ATTEST
Melvin C. Flint

INVENTOR.
John P. Woods
BY Norbert E. Birch
Attorney

Feb. 10, 1953 J. P. WOODS 2,627,930
APPARATUS FOR UNDERWATER SEISMIC OPERATIONS
Filed July 9, 1948 6 Sheets-Sheet 5

ATTEST
Melvin C. Flint

INVENTOR.
John P. Woods
BY Herbert E. Birch
Attorney

Patented Feb. 10, 1953

2,627,930

UNITED STATES PATENT OFFICE 2,627,930

APPARATUS FOR UNDERWATER SEISMIC OPERATIONS

John P. Woods, Dallas, Tex., assignor to The Atlantic Refining Company, Philadelphia, Pa., a corporation of Pennsylvania Application July 9, 1948, Serial No. 37,886

4 Claims. (Cl. 181—.5)

This invention relates to improvements in seismic exploration and more particularly to a system for underwater seismic exploration.

The technique of seismic exploration has been largely evolved as a result of the continuous search for petroleum. As is well known, the ordinary method consists in generating seismic waves at certain points, commonly designated as "shot points," receiving such waves by instruments known as seismometers, geophones, or "jugs" at selective points relative to the shot point, and recording the received waves in such a manner that the travel time between the shot point and points of reception will give an indication of the depth and nature of the tectonic formations through which such waves have passed. It readily will be understood that when such exploration is carried out on land no particular difficulty is experienced in placing the seismic wave generator and the seismometers, or in moving the same from point to point through the area.

The search for areas favorable to the location of petroleum deposits recently has centered around areas covered by bodies of water, too deep for the adaptation of the conventional methods of seismic exploration heretofore employed on land.

Originally, underwater seismic exploration was carried on by the use of modified land technique. In this modified land technique, a plurality of seismometers are planted by hand as the vessel is moved along course, the line of seismometers so planted forming what is commonly referred to as a "spread." In a similar manner, explosive charges are deposited at selected shot points. The explosive charges are then detonated, thereby generating seismic waves which are reflected from subterranean formations and received by the seismometers. After recordation of the received seismic waves, the seismometers making up the spread are taken up and moved to the next location. The results of this procedure have not been entirely unsatisfactory. However, it is much too slow and costly.

Another method has been to tow from the stern of a vessel a cable having attached thereto at spaced intervals a plurality of seismometers. Upon arrival at a desired reception point an additional amount of cable is let out, thereby permitting the seismometers to come to rest while the vessel proceeds on course to a point at which it is desired to establish a shot point. At this point an explosive charge operatively connected to a shooting cable is lowered over the side of the vessel and the vessel continues forward a safe distance from the shot point. Following detonation of the explosive charge and recordation of received seismic waves, it is necessary to reel in not only the additional amount of cable, previously let out but also the shooting cable. The seismometers are then towed to the next location. This method is also slow and costly, and moreover it is not adaptable to "split spread" shooting, an arrangement of seismometers and explosive charge in which the explosive charge is placed on a line perpendicular to the center of the seismometer spread. The "split spread" is a commonly preferred arrangement for reflection shooting.

In order to avoid damaging the seismometers and the seismometer tow cable when employing a split spread, the explosive charge must be placed a safe distance laterally of the center of the seismometer spread. Heretofore, it has been necessary to utilize two vessels for such an operation, one vessel, normally the recording vessel, for laying out the seismometer, and the other, the shooting vessel. Such a method again results in high operational costs, and further, difficulty is experienced in coordinating the operations.

Accordingly, one object of the present invention is to provide a system for underwater exploration whereby split spread shooting may be performed from a single vessel.

Another object of the invention is to provide means operable in conjunction with the seismometer spread to locate at all times a seismic wave generator at a substantially fixed position laterally of the seismometer spread, and means for controlling the locating means from the vessel from which the seismometer spread is laid.

Another object of the invention is to provide means operable in conjunction with the seismometer spread to locate at all times a seismic wave generator at a substantially fixed position laterally of the seismometer spread and above the water bottom, and means for controlling the locating means from the vessel from which the seismometer spread is laid.

Other objects of the invention will be apparent from the description and drawings which follow.

Figure 1:
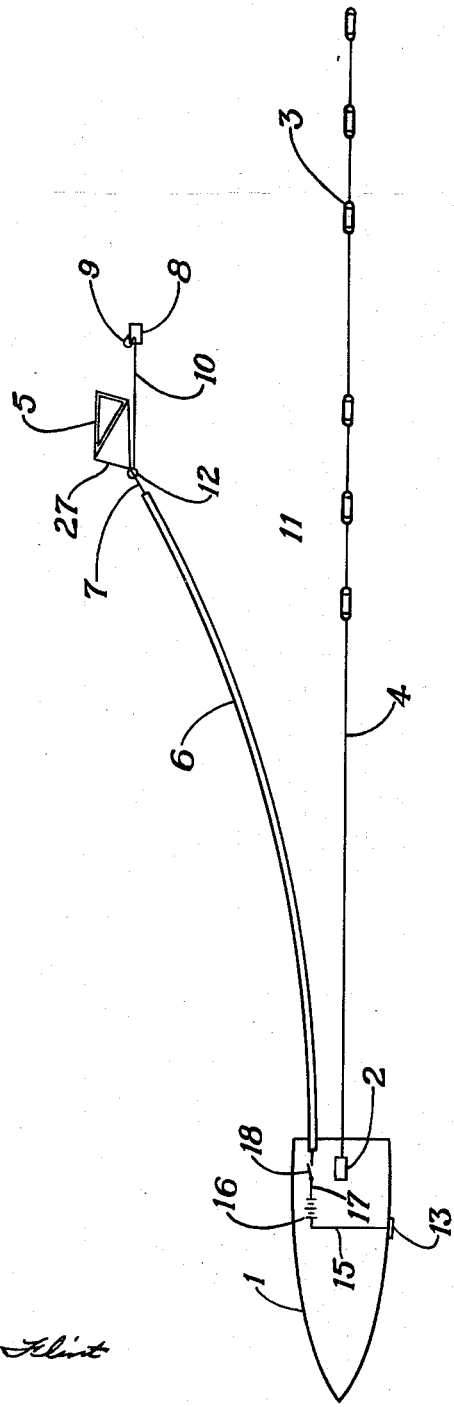
Figure 1 is a plan view showing the relative positions of the seismic generator, the seismic generator location means, hereinafter termed a "paravane," and a seismometer spread, during towing of the several elements by the single vessel.

Referring now to the drawings, the numeral 1 denotes generally a vessel carrying seismic wave recording means 2 and adapted to drag along the underwater terrain a plurality of seismometers 3, provided at spaced intervals along a drag cable 4, and enclosed within an armored shell. Electrical conductors, not shown, are enclosed within drag cable 4 for transferring independently the seismic waves received by each of the seismometers 3 to recording means 2. A suitable arrangement of seismometers and drag cable is disclosed in my copending United States application for patent, Serial No. 755,410, filed June 18, 1947, entitled "Seismic Method and Apparatus."

Paravane 5, which will be described more fully hereinafter, is towed astern vessel 1 and substantially at the surface of the water by means of a single conductor tow cable 6 enclosed within a protective and insulating rubber casing. A suitable length of the casing, for example, two to three feet, is removed from cable 6 at its end adjacent paravane 5 thereby providing an exposed portion 7.

Numeral 8 denotes generally an explosive charge preferably encased in a metal container and adapted to be detonated by means of an electrical potential applied between a pair of insulated actuating conductors 9 and 10 in contact with a blasting cap, not shown, of explosive charge 8. Actuating conductor 9 is soldered, or otherwise secured to the metal container of explosive charge 8 to assure good contact with the water generally denoted by the numeral 11. Metal clip 12 is attached to the free end of actuating conductor 10 in a manner to move slidably over cable 6. As vessel 1 proceeds on course toward a preselected reception point, clip 12 is attached to cable 6 and explosive charge 8 is lowered overboard whence it will be caused to be moved rearwardly to the end of cable 6 and to be brought into contact with exposed portion 7 of the cable.

Plate 13 of any suitable metal is secured to the hull of vessel 1 below the surface 14 of water 11, and to it is connected one terminal 15 of a source of electrical potential 16. The other terminal 17 may be connected through firing switch 18 to cable 6. Thus, it will be seen that by closing firing switch 18, explosive charge 8 will be detonated by the flow of current through cable 6, conductors 10 and 9, water 11, and conductor 15.

Paravane 5 may be so constructed and arranged that at the moment of towing, it will be caused to move to any desired point laterally from the seismometer spread to avoid damage to seismometers 3 and cable 4 due to detonation of explosive charge 8. Likewise, it is important that cable 10 be of such a length that damage will not occur to paravane 5 upon detonation of explosive charge 8.

A distance of approximately 200 feet between the point of explosion and the nearest seismometer of the seismometer spread has been found to be satisfactory.

Figure 3:
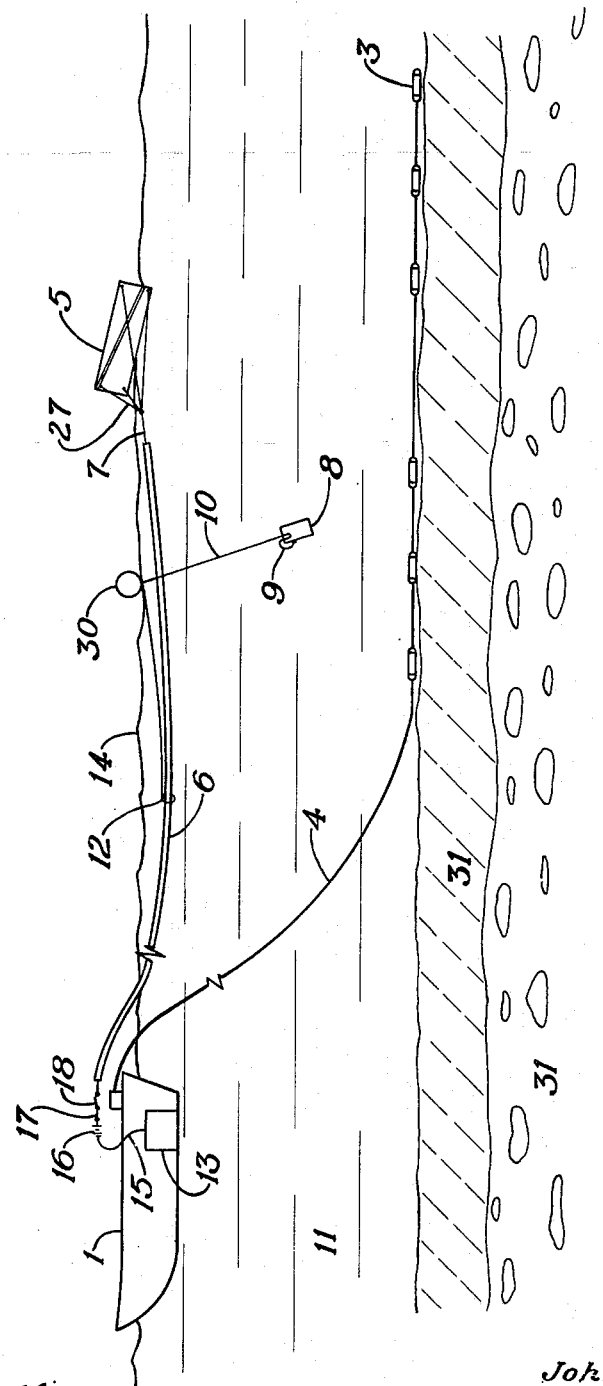
Figure 3 is a side elevational view similar to Figure 2, with the exception that there is shown in this figure the means for locating the seismic generator at a level above the water bottom.
Figure 4:
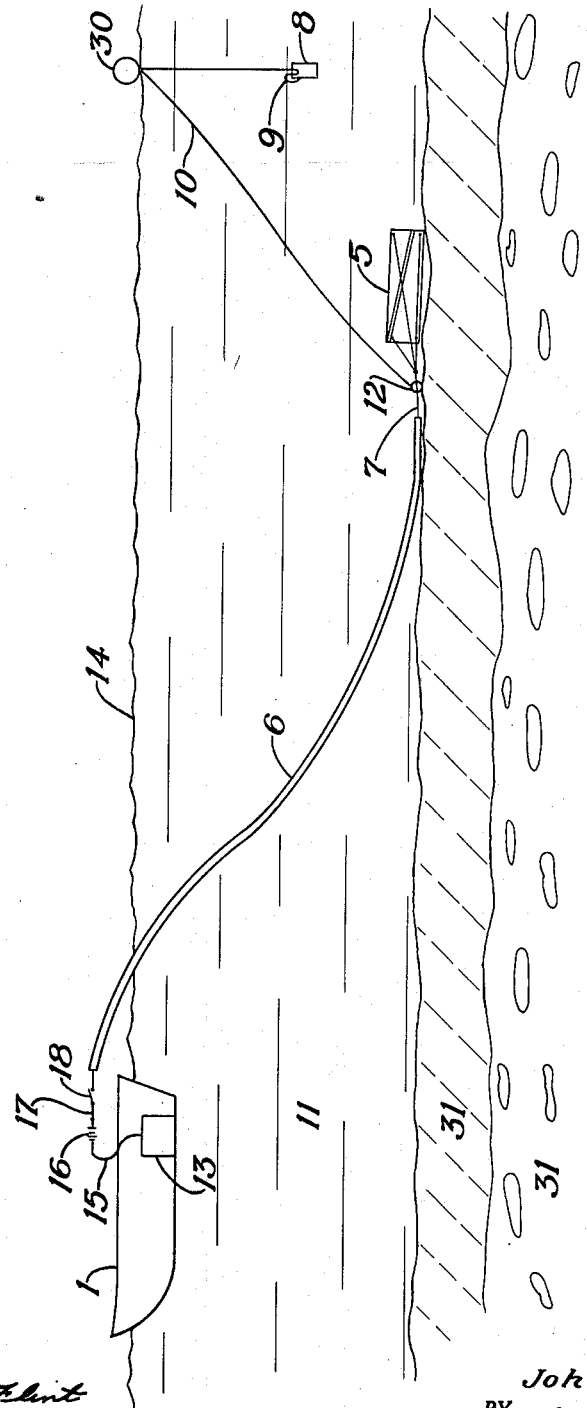
Figure 4 is a side elevational view showing the relative positions of the paravane and the seismic generator during interruption of the towing thereof, and immediately prior to detonation of the seismic generator. In this figure the seismometers are not shown.

It frequently is desirable to detonate the explosive charge at a point above the water bottom. Accordingly, as shown in Figures 3 and 4, a float means, for example, a balloon 30, may be suitably attached to conductor 10 in a manner to suspend explosive charge 8 above the bottom of the water. Figure 3 exemplifies the relative positions of charge 8, balloon 30, and paravane 5 upon release of the explosive charge from vessel 1.

In Figure 4, their relative positions preparatory to detonating the charge are shown.

Figure 5:
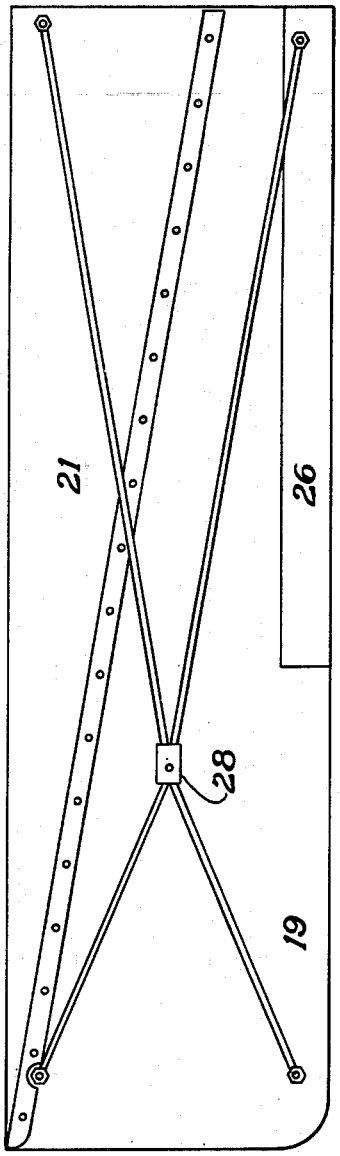
Figure 5 is a side elevation of the paravane.
Figure 7:
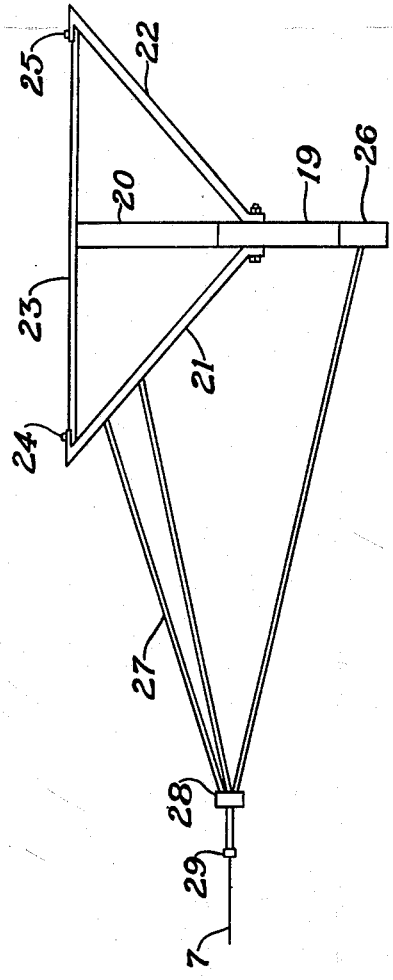
Figure 7 is an end elevation of the paravane of Figure 5.
Figure 6:
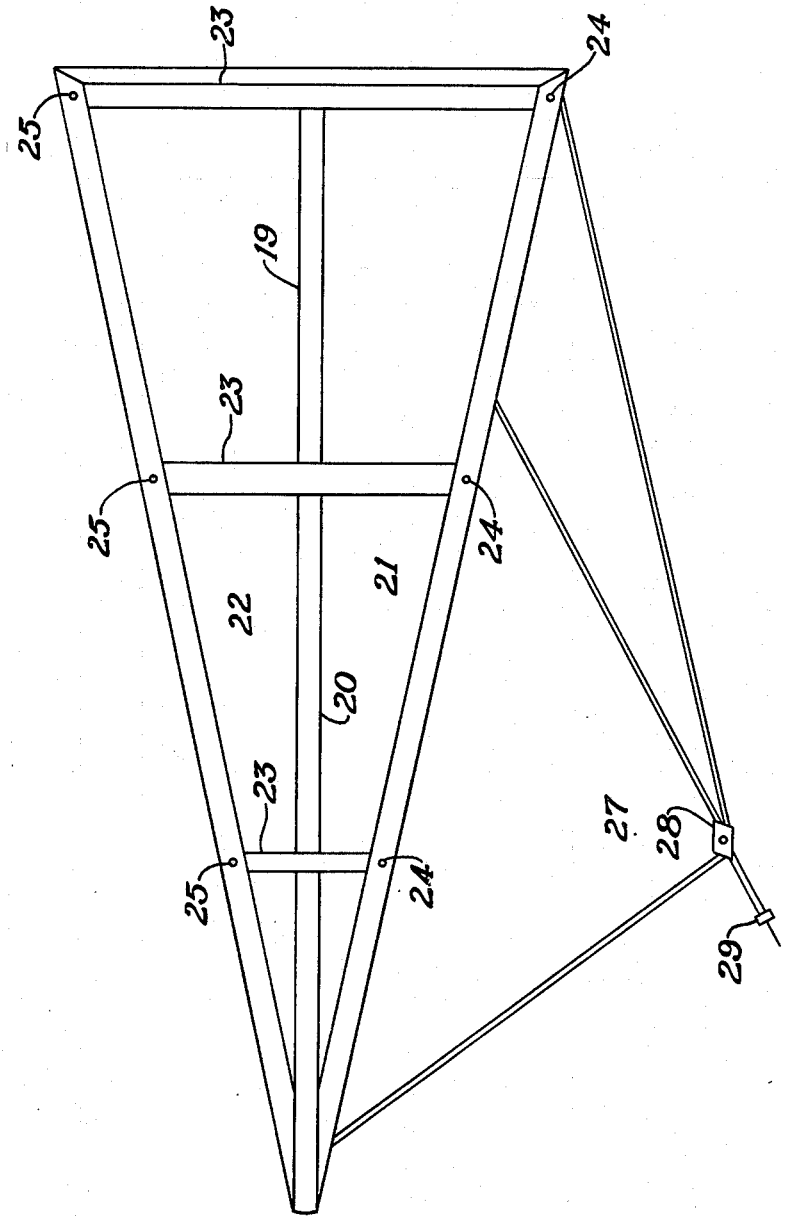
Figure 6 is a plan view of the paravane of Figure 5.

Referring to Figures 5, 6, and 7, paravane 5 includes a keel 19 preferably constructed of wood and in the form of a quadrilateral having the upper edge 20 thereof sloping rearwardly. Attached by any suitable means, such as by bolts, along upper edge 20 are a pair of upwardly, outwardly diverging vanes 21 and 22 consisting of metal sheets, such as, for example, aluminum, substantially in the form of congruent right triangles and complementary to keel 19. Although the degree of divergence of the vanes may vary to a limited extent, it is preferable to have each of the vanes 21 and 22 form an angle of approximately 50 degrees with the plane of keel 19. This construction renders the paravane stable and causes it to ride substantially on the surface of the water during the towing thereof.

A plurality of lateral support bars 23 rigidly secures vanes 21 and 22 as by both bolts 24 and 25 relative to edge 20 of keel 19.

A weight bar 26 is suitably secured adjacent the bottom and aft end of keel 19, and is of a weight sufficient to cause paravane 5 to sink substantially immediately upon interruption of the towing thereof, and thus to prevent charge 8 from drifting away from the shot point.

To avoid damage to the seismometers 3 upon detonation of explosive charge 8, paravane 5 must be maintained well out to the side of the spread, as pointed out hereinbefore. For this purpose paravane 5 is provided with a four-wire bridle 27, each of the wires being secured respectively at one of its ends to a corner of paravane 5, as shown, and at its other end to bridle plate 28. Bridle plate 28 is attached in turn to cable 6 through the mechanism of dielectric 29, and thus is electrically insulated therefrom. The distance at which paravane 5 will ride laterally of the seismometer spread is established by the adjustment of the length of bridle 27 wires.

In operation, vessel 1 proceeds on course toward a desired reception location while simultaneously dragging the seismometer spread on the water bottom, and towing paravane 5 on the surface and at a desired position relative to the spread. On approaching the reception location, metal clip 12 is manually secured to cable 6 and explosive charge 8 is lowered overboard. Water 11 will cause explosive charge 8 to be moved rearwardly relative to vessel 1 until such time as clip 12 contacts the exposed portion 7 of cable 6. In the event it is necessary or desirable to detonate explosive charge 8 above the water bottom, a float means 30 may be attached to conductor 10 at a point sufficiently near explosive charge 8 to cause explosive charge 8 to be suspended within the water 11, as shown in Figure 3. Upon arrival at the desired reception location, forward motion of vessel 1 is interrupted, thereby permitting seismometers 3 to come to rest and to cause paravane 5 to sink substantially immediately to the bottom of the water, and at the proper time charge 8 is detonated by the closing of switch 18. Seismic waves generated by charge 8 will be reflected off subterranean formations, denoted generally by the numeral 31, and received by the plurality of seismometers 3. The received seismic waves are transferred to seismic wave recording means 2 through drag cable 4, as described hereinbefore. After recordation of the received seismic waves, forward motion of vessel 1 is resumed toward the next reception location. In accordance with this procedure as many as 70 or more "shots" may be taken without pulling in the paravane to remove accumulated clips from cable 6, the only limitation being that the number of accumulated clips shall not be so great as to prevent a clip, which has been attached to cable 6 and to which is connected an explosive charge, from coming into contact with exposed portion 7.

Figure 2:
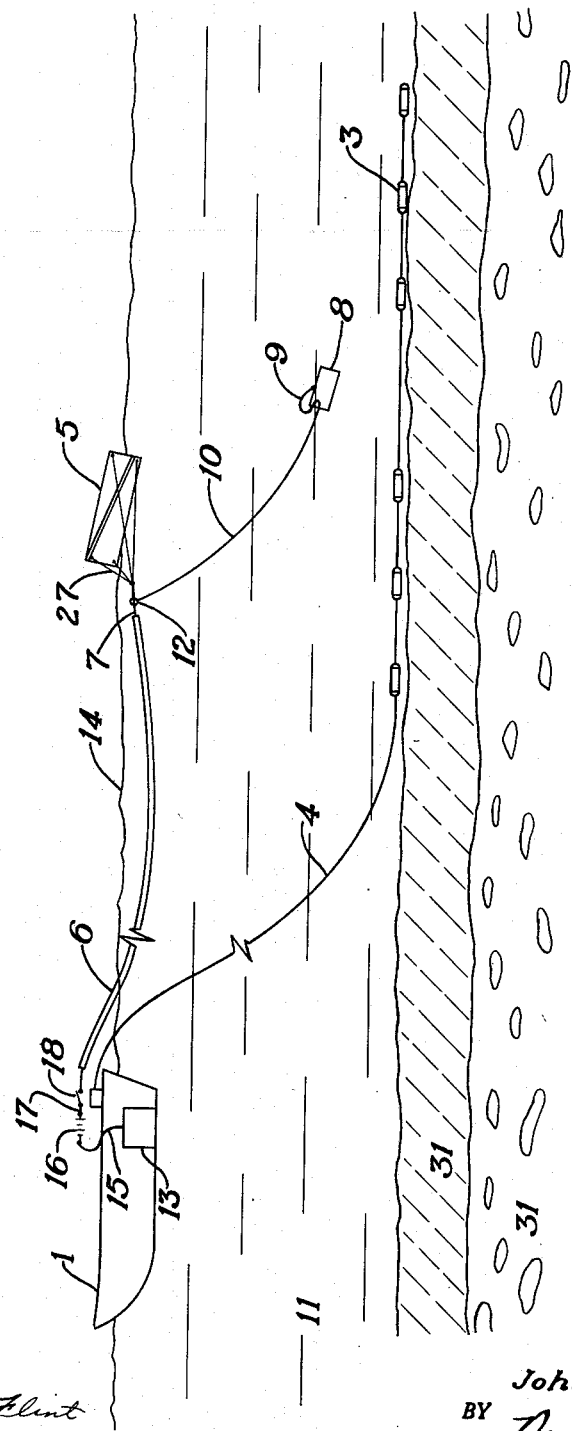
Figure 2 is a side elevational view of Figure 1.

Although the preferred form of paravane is that shown in Figures 5 to 7, inclusive, other forms are possible. Further, the paravane can be used with a floating spread, such, for example, as that described in U. S. Patent No. 2,241,428, entitled "Apparatus for Underwater Seismic Surveying," issued on May 13, 1941, to D. Silverman, as well as with a spread adapted to be dragged along the water bed, as shown in Figures 2 and 3.

It should be pointed out that although this system provides a simple means for "split spread" shooting, it also can be used for shooting at or beyond the ends of a spread, which is commonly referred to as "in line" shooting.

Although for the purpose of simplification description of the invention has been restricted to a single paravane, there may be employed a second tow cable and a second paravane having a bridle attached thereto in a manner to permit the paravane when being towed by such cable to ride at a desired distance laterally of the seismometer spread and opposite that of the first paravane.

I claim:

1. In a system for underwater seismic exploration in which a series of seismic wave receivers are spacedly arranged linearly, rearwardly of a vessel provided with recording means operatively connected with each of the receivers through the medium of a conductor drag cable, the combination of means for successively locating a plurality of explosive charges laterally of the line of receivers and for successively individually exploding the explosive charges at will, comprising a paravane, an insulated conductor cable secured to the vessel, bridle means operatively connecting the paravane in tow to the conductor cable in a manner such that during movement of the vessel, the paravane will be caused to travel in a line parallel to and laterally a predetermined distance from the line of the receivers, a portion of the conductor cable adjacent the paravane being bare of insulation, each explosive charge having first and second actuating conductors operatively connected thereto, said first actuating conductor being adapted to make electrical contact with the water, means for securing said second actuating conductor in contact with and for free movement along the conductor cable whereby during forward movement of the vessel the explosive charge will be caused to move rearwardly with respect to said vessel to bring said second actuating conductor into contact with the bare portion of the conductor cable adjacent the paravane, the presence of said paravane serving to keep said second conductor from passing beyond said bare portion, and means including a source of electrical potential and switch means operatively connected with the cable to selectively flow current therethrough and to explode the explosive charge.

2. In a system for underwater seismic exploration in which a series of seismic wave receivers are spacedly arranged linearly, rearwardly of a vessel provided with recording means operatively connected with each of the receivers through the medium of a conductor drag cable, the combination of means for successively locating a plurality of explosive charges laterally of the line of receivers and for successively individually exploding the explosive charges at will, comprising a paravane, an insulated conductor cable secured to the vessel, bridle means operatively connecting the paravane in tow to the conductor cable in a manner such that during movement of the vessel, the paravane will be caused to travel in a line parallel to and laterally a predetermined distance from the line of the receivers, a portion of the conductor cable adjacent the paravane being bare of insulation, each explosive charge having first and second actuating conductors operatively connected thereto, said first actuating conductor being adapted to make electrical contact with the water, means for securing said second actuating conductor in contact with and for free movement along the conductor cable whereby during forward movement of the vessel the explosive charge will be caused to move rearwardly with respect to said vessel to bring said second actuating conductor into contact with the bare portion of the conductor cable adjacent the paravane, the presence of said paravane serving to keep said second conductor from passing beyond said bare portion, and means including a source of electrical potential, a switch operatively connecting the conductor cable and one end of the source of electrical potential, and a metal plate secured to the vessel below the surface of the water and attached to the other end of the source of electrical potential to selectively flow current therethrough and to explode the explosive charge.

3. In a system for underwater seismic exploration in which a series of seismic wave receivers are spacedly arranged linearly, rearwardly of a vessel provided with a recording means operatively connected with each of the receivers through the medium of a conductor drag cable, the combination of means for successively locating rearwardly of said vessel a plurality of explosive charges each having first and second actuating conductors operatively connected thereto and for successively individually exploding said charges at will, comprising a conductor cable secured to the vessel and adapted to be towed therebehind, said conductor cable being bare for a portion of its length at the trailing end thereof and being electrically insulated throughout the remainder of its length, said first actuating conductor of each explosive charge being adapted to make electrical contact with the water, means for securing each of said second actuating conductors in contact with and for free movement along the conductor cable whereby during forward movement of the vessel the explosive charge will be caused to move rearwardly with respect to said vessel to bring the second actuating conductor into contact with the bare portion of the conductor cable, means secured to the trailing end of said conductor to prevent said second actuating conductor from passing rearwardly beyond said bare portion, and means including a source of electrical potential and a switch means operatively connected with the cable to selectively flow current therethrough and to explode the explosive.

4. In a system for underwater seismic exploration in which a series of seismic wave receivers are spacedly arranged linearly, rearwardly of a vessel provided with a recording means operatively connected with each of the receivers through the medium of a conductor drag cable, the combination of means for successively locating rearwardly of said vessel a plurality of explosive charges each having first and second actuating conductors operatively connected thereto and for successively individually exploding said charges at will, comprising a conductor cable secured to the vessel and adapted to be towed therebehind, said conductor cable being bare for a portion of its length at the trailing end thereof and being electrically insulated throughout the remainder of its length, said first actuating conductor of each explosive charge being adapted to make electrical contact with the water, means for securing each of said second actuating conductors in contact with and for free movement along the conductor cable whereby during forward movement of the vessel the explosive charge will be caused to move rearwardly with respect to said vessel to bring the second actuating conductor into contact with the bare portion of the conductor cable, means secured to the trailing end of said conductor to prevent said second actuating conductor from passing rearwardly beyond said bare portion, and means including a source of electrical potential, a switch operatively connecting the conductor cable and one end of the source of electrical potential, and a metal plate secured to the vessel below the surface of the water and attached to the other end of the source of electrical potential to selectively flow current therethrough and to explode the explosive charge.

JOHN P. WOODS.

REFERENCES CITED

The following references are of record in the file of this patent:

UNITED STATES PATENTS

| Number | Name | Date |
|---|---|---|
| 1,378,960 | Horton | May 24, 1921 |
| 1,400,211 | Burney | Dec. 13, 1921 |
| 2,324,378 | Flude | July 13, 1943 |
| 2,414,480 | Morrill | Jan. 21, 1947 |
| 2,423,591 | Flude | July 8, 1947 |
| 2,465,696 | Paslay | Mar. 29, 1949 |